US010801861B2

(12) United States Patent
 Demange (10) Patent No.: US 10,801,861 B2
(45) Date of Patent: Oct. 13, 2020

(54) METHODS FOR ALIGNING INERTIAL NAVIGATION SYSTEMS

(71) Applicant: SAFRAN ELECTRONICS & DEFENSE, Boulogne-Billancourt (FR)

(72) Inventor: Jean Luc Demange, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/341,172

(22) PCT Filed: Oct. 6, 2017

(86) PCT No.: PCT/EP2017/075547
§ 371 (c)(1),
(2) Date: Apr. 11, 2019

(87) PCT Pub. No.: WO2018/069191
PCT Pub. Date: Apr. 19, 2018

(65) Prior Publication Data
US 2020/0200565 A1    Jun. 25, 2020

(30) Foreign Application Priority Data
Oct. 11, 2016 (FR) ...................................... 16 59806

(51) Int. Cl.
*G01C 25/00* (2006.01)
*G01C 21/16* (2006.01)

(52) U.S. Cl.
CPC .......... *G01C 25/005* (2013.01); *G01C 21/16* (2013.01)

(58) Field of Classification Search
CPC .............................. G01C 25/005; G01C 21/16
See application file for complete search history.

(56) References Cited

U.S. PATENT DOCUMENTS

2007/0282528 A1* 12/2007 Morgan ............... G01C 21/165
                                                                  701/510
2014/0372063 A1    12/2014 Niu et al.
2016/0305779 A1* 10/2016 Keyzer .................. G01C 21/16

FOREIGN PATENT DOCUMENTS

EP         1 862 764 A1    12/2007
WO     2011/045032 A1     4/2011

OTHER PUBLICATIONS

French Search Report for 1659806 dated Jun. 29, 2017.
International Search Report for PCT/EP2017/075547 dated Feb. 9, 2018.

* cited by examiner

*Primary Examiner* — David Z Huang
(74) *Attorney, Agent, or Firm* — Sughrue Mion, PLLC (57) ABSTRACT

The invention relates to a method for aligning an inertial navigation system borne by a static or quasi-static carrier, wherein: a plurality of alignment processes that are dimensioned for a plurality of amplitudes of movements of the carrier are implemented simultaneously with different alignment observation durations; a minimum observation duration that corresponds to the alignment observation duration for which the consistency of the alignment information obtained by means of alignment processes dimensioned for a given movement amplitude of the carrier is determined; and the alignment information is determined depending on alignment information determined for this minimum observation duration. The invention also relates to an associated inertial navigation system.

9 Claims, 7 Drawing Sheets

METHODS FOR ALIGNING INERTIAL NAVIGATION SYSTEMS

CROSS REFERENCE TO RELATED APPLICATIONS

This application is a National Stage of International Application No. PCT/EP2017/075547 filed Oct. 6, 2017, claiming priority based on French Patent Application No. 1659806, filed Oct. 11, 2016, the entire contents of each of which are herein incorporated by reference in their entireties.

FIELD OF THE INVENTION

The present invention relates to a method for aligning an inertial navigation system situated on a static or quasi-static carrier.

It also relates to an inertial system implementing such an alignment process.

PRIOR ART

The initialization of an inertial localization consists of elaborating initial values of attitude, of speed and of position of the inertial localization algorithm. This step corresponds to a mode of inertial navigations systems called "alignment."

The initialization of an inertial localization comprises a large number of variables, depending on the applications, and classified in two categories:
- static alignment in the case where the carrier is not moving,
- alignment during movement in the case of a movable ground-based carrier.

The movements of the carrier during a static alignment degrade the accuracy of the initialization of navigation. Most applications integrate a movement detection function to confirm the immobility of the carrier and secure the alignment of the inertial navigation. Various algorithms use inertial measurements to detect the movements of the carrier. They can use in addition information of the "weight on wheels" (wow), parking brake (land-based vehicle or aircraft), rotor power (helicopter), collective pitch (helicopter), etc. type.

The detection capacity of movement detection algorithms depends on the type of movement. In the case of low-frequency oscillatory movements, current movement tests, due to the limited accuracy of inertial sensors used for inertial localization, are not sufficient for ensuring the soundness of the static alignment algorithm.

Recalled below are a few known results regarding least-squares regressors, because they constitute a means of estimating the initialization of an inertial localization by observation of the inertial speeds or by observation of inertial displacements obtained by integration of the inertial speeds.

On a static or quasi-static carrier and after a coarse alignment phase, the horizontal speed errors of an inertial localization can be modeled by polynomials which are functions of the duration of alignment and which are of order 2 for each of the horizontal axes. The coefficients of these 2 polynomials allow estimation of the attitude and speed errors of the inertial localization and hence accomplishing the alignment. In the same manner, the horizontal displacement errors of an inertial localization can be modeled by polynomials that are functions of the duration of alignment and of order 3 for each of the horizontal axes. The coefficients of these 2 polynomials allow estimation of the errors of attitude and speed of the inertial localization and hence accomplishing the alignment. The use of a regressor using inertial displacements is well suited to the case of oscillatory carriers.

Moreover, it is well known that the estimation of the heading error of the inertial localization is very sensitive to the movements of the carrier because it relies on the rotation of the earth which is a physical signal that is much harder to measure than earth's gravity. This heading estimation is deduced from the curvature for a regressor observing the inertial speeds or from the polynomial of order 3 for a regressor observing inertial displacements.

Kalman filters also constitute a conventional means of estimating the initialization of an inertial localization. One known advantage of least-squares regressors compared to Kalman filters is that it is known how to simply limit the effect on the alignment of a parasitic movement based on the assumption that this movement is of known and limited amplitude.

The table below restates the maximum impact on the polynomial coefficient cmax or dmax of the highest order for regressors of order 2 and 3 which observe a signal of limited amplitude V in speed or D in displacement. It is known that the maximum impact is attained for a signal which commutes between its limits (+ or − V if observing errors in speed, + or − D if observing displacements) exactly 2 times for a regressor of order 2 or 3 times for a regressor of order 3.

| | Least squares regressor of order 2 | Least squares regressor of order 3 |
|---|---|---|
| Commuting instants | 2 commuting instants which are denoted u1 and u2: | 3 commuting instants which are denoted u1, u2 and u3: |
| | $u1 = 1/2 - \frac{\sqrt{3}}{6}$ | $u1 = 1/2 - \frac{\sqrt{15}}{10}$ |
| | | $u2 = 1/2$ |
| | $u2 = 1/2 + \frac{\sqrt{3}}{6}$ | $u3 = 1/2 + \frac{\sqrt{15}}{10}$ |
| Maximum term of the highest order | $c_{max} = \frac{20 \cdot V}{\sqrt{3} \cdot T^2}$ | $d_{max} = \frac{91 \cdot D}{2 \cdot T^3}$ | where T represents the duration of the temporal regression and u represents the normalized time u=t/T.

Figure 1:
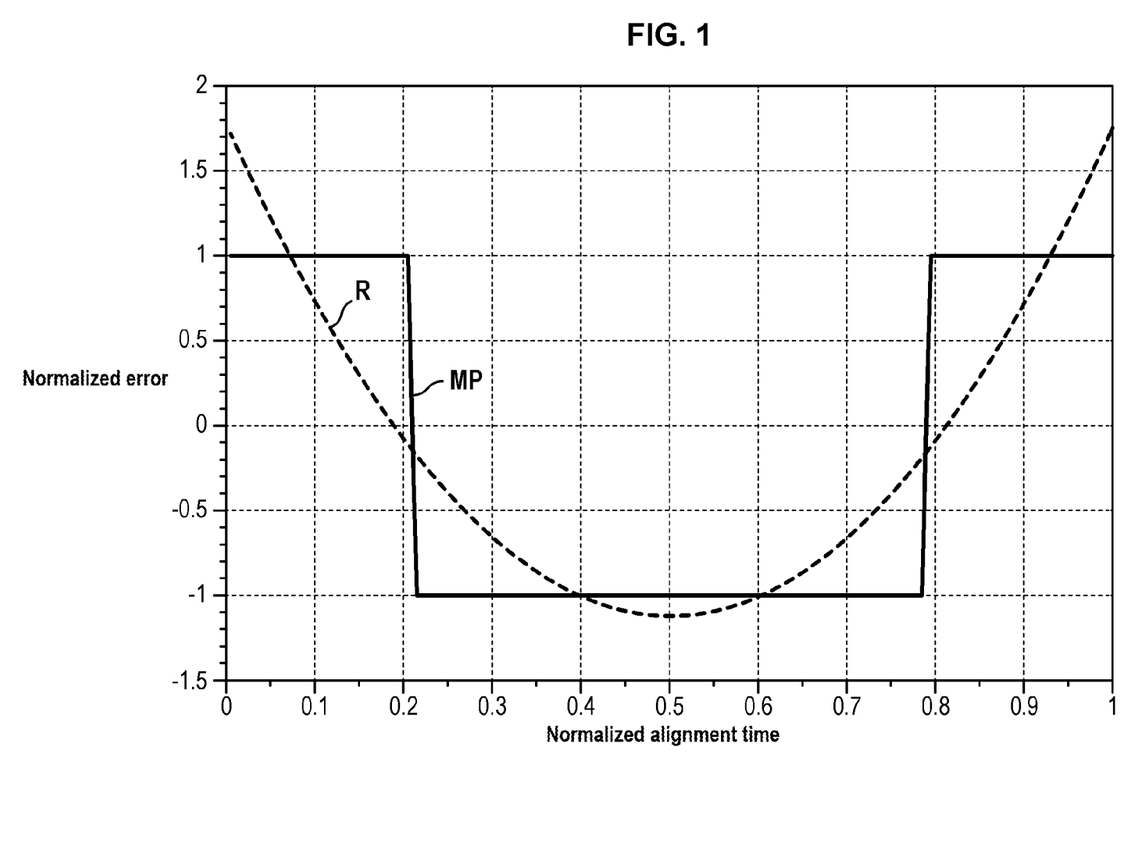
FIGS. 1 and 2 each show schematically, on the one hand a curve of the most unfavorable movement of the carrier, and on the other hand a curve giving the maximum curvature error in the case of a polynomial estimation of order 2 and a polynomial estimation of order 3.

FIG. 1 presents a scenario for the model of order 2 (there exists a second, symmetrical scenario). In the abscissa, the normalized time and in the ordinate, the normalized error equal to error/V.

In this figure, the curve MP shows the corresponding movement in the worst case. The curve R is that of the regressor of order 2.

On the curve, the movement of the carrier commutes 2 times between its limits. This thus causes the maximum curvature error cmax on the polynomial estimate of order 2.

It is known that the maximum inertial drift induced by the movements of the carrier is thus equal to:

$$\text{maximum\_inertial drift} = \frac{2c_{max}}{g} = \frac{40V}{\sqrt{3}\,gT^2}$$

where g represents earth's gravity.

Figure 2:
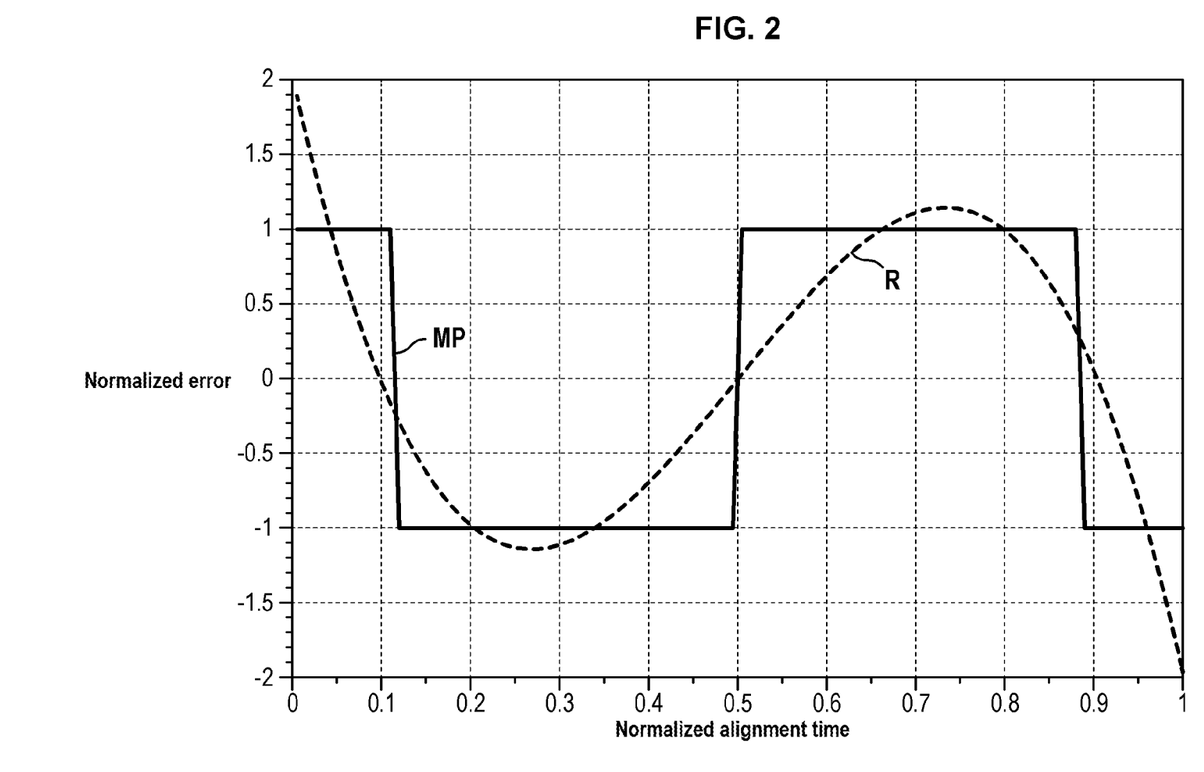

FIG. 2, for its part, illustrates a scenario for the model of order 3. In the abscissa, the normalized time u, in the ordinate, the normalized error equal to error/D.

The movement of the carrier commutes 3 times (curve MP) between its limits (+ or − D). This thus creates the maximum error dmax in the coefficient of order 3 of the polynomial estimate of order 3 (curve R). It is known that the maximum inertial drift induced by the movements of the carrier is equal to $$\text{maximum\_inertial drift} = \frac{6 \cdot d_{max}}{g} = \frac{273 \cdot D}{g \cdot T^3}$$

Regardless of the regressor, the maximum inertial drift induced by the movements of the carrier must remain small compared to the accuracy of inertial sensors. An order of magnitude that is customarily considered is that the drift induced by the movements must be less than a third of the drift of the gyros used for the inertial localization because ⅓ in all of the RMS causes a deterioration of approximately 10%.

Thus, for a given amplitude of the movements of the carrier, the alignment is the more perturbed if it is organized for a high duration of observation T. This result also applies to the other types of estimators, in particular those based on a Kalman filter.

GENERAL PRESENTATION OF THE INVENTION

A general goal of the invention is to propose an alignment method which does not have the disadvantages of the prior art and which allows an improvement in soundness with respect to parasitic movement.

In particular, one goal of the invention is to propose an alignment method allowing a maximum inertial drift induced by the movements of the carrier to be small compared with the accuracy of inertial sensors.

The present invention proposes to accomplish several alignments simultaneously (by least squares regression, by Kalman filtering or by means of any other estimator of errors in an inertial localization) dimensioned for several amplitudes of low frequency oscillatory movements and to select the alignment of minimum duration the consistency of which has been confirmed by inter-alignment consolidation.

Thus proposed is a method of aligning an inertial navigation system carried by a static or quasi-static carrier, in which:

several alignment processes are implemented simultaneously dimensioned with distinct observation durations, the minimum observation duration for which the consistency of the alignment information obtained is confirmed by testing the consistency of alignment information obtained for the smallest observation duration and also if applicable the consistency of alignment information obtained for longer observation durations is determined, the alignment information is determined depending on the alignment information determined for this minimum observation duration.

Such a method is advantageously completed by the following different features, taken alone or in combination:

the alignment information retained is the latest alignment information determined for the minimum observation duration;

the alignment information retained is an average of the latest alignment information determined for the minimum observation duration and the alignment information determined just before by the same process and for the same minimum observation duration;

the alignment information retained is the alignment information determined with a process:

which is dimensioned for the carrier movements amplitude of the alignment process implemented with the selected minimum observation duration, and which is implemented for a longer observation duration.

The invention also relates to an inertial system, characterized in that it includes processing means adapted to implement the aforementioned method.

PRESENTATION OF THE FIGURES

Other features and advantages of the invention will be revealed by the description that follows, which is purely illustrative and not limiting, and must be read with reference to the appended drawings in which.

DETAILED DESCRIPTION OF THE INVENTION

Generalities Regarding the Inertial System

Figure 3A:
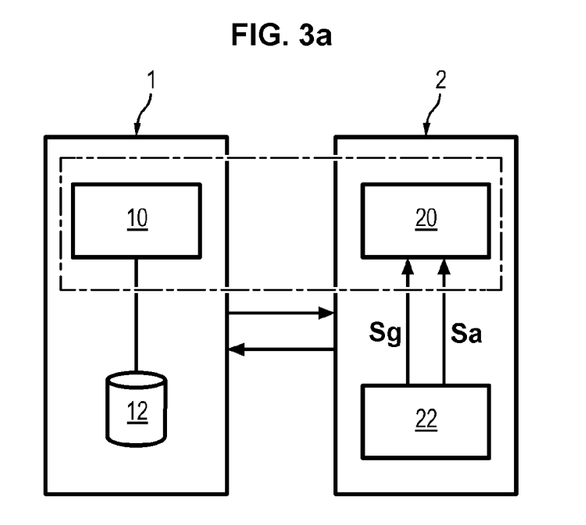
FIGS. 3a and 3b illustrate two possible embodiments for an inertial system conforming to different modes of the invention.

In a first embodiment, with reference to FIG. 3a, an (inertial) system comprises a processing unit 1 and an inertial navigation system 2.

The data processing unit 1 typically comprises at least one processor for implementing a computer program. This computer program comprises program code instructions configured to implement the improved alignment device 10. This processing unit can share that of the inertial navigation system 2 ounted on a static carrier or driven with parasitic movements such as a vehicle, a boat or an aircraft. The inertial navigation system 2 comprises a navigation unit 20 and inertial sensors 22. The inertial navigation unit 2 can also comprise a user interface.

The inertial sensors 22 comprise for example accelerometers supplying measurements Sa and gyroscopes supplying measurements Sg.

The navigation unit 20, known in se, is in particular configured to implement an inertial localization and a coarse alignment which accomplishes the estimation of attitudes to within a few degrees in conformity with a known method of the prior art. The navigation unit 20 comprises for example a processor configured to execute an algorithm for maintaining the inertial localization. Moreover, the improved alignment device 10 and the navigation unit 20 can be autonomous physical components or grouped within the same housing.

The processing unit 1 also comprises a memory 12 for storing data, particularly measurements received from the inertial navigation system 2.

As a variant (FIG. 3b), the system comprises a processing unit 1 and an Inertial Measurement Unit 2b is also called an IMU.

Examples of Alignment Processing

Figure 3B:
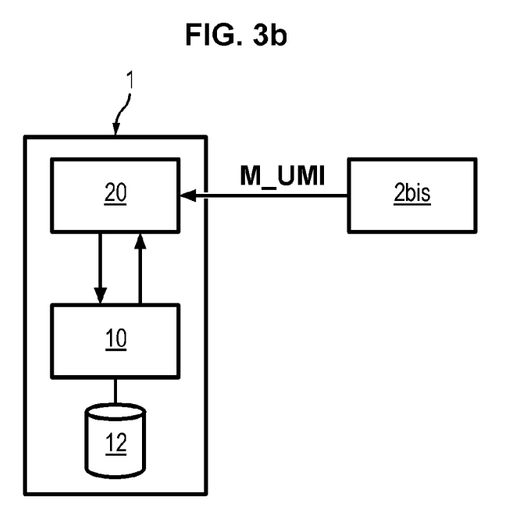
Figure 4:
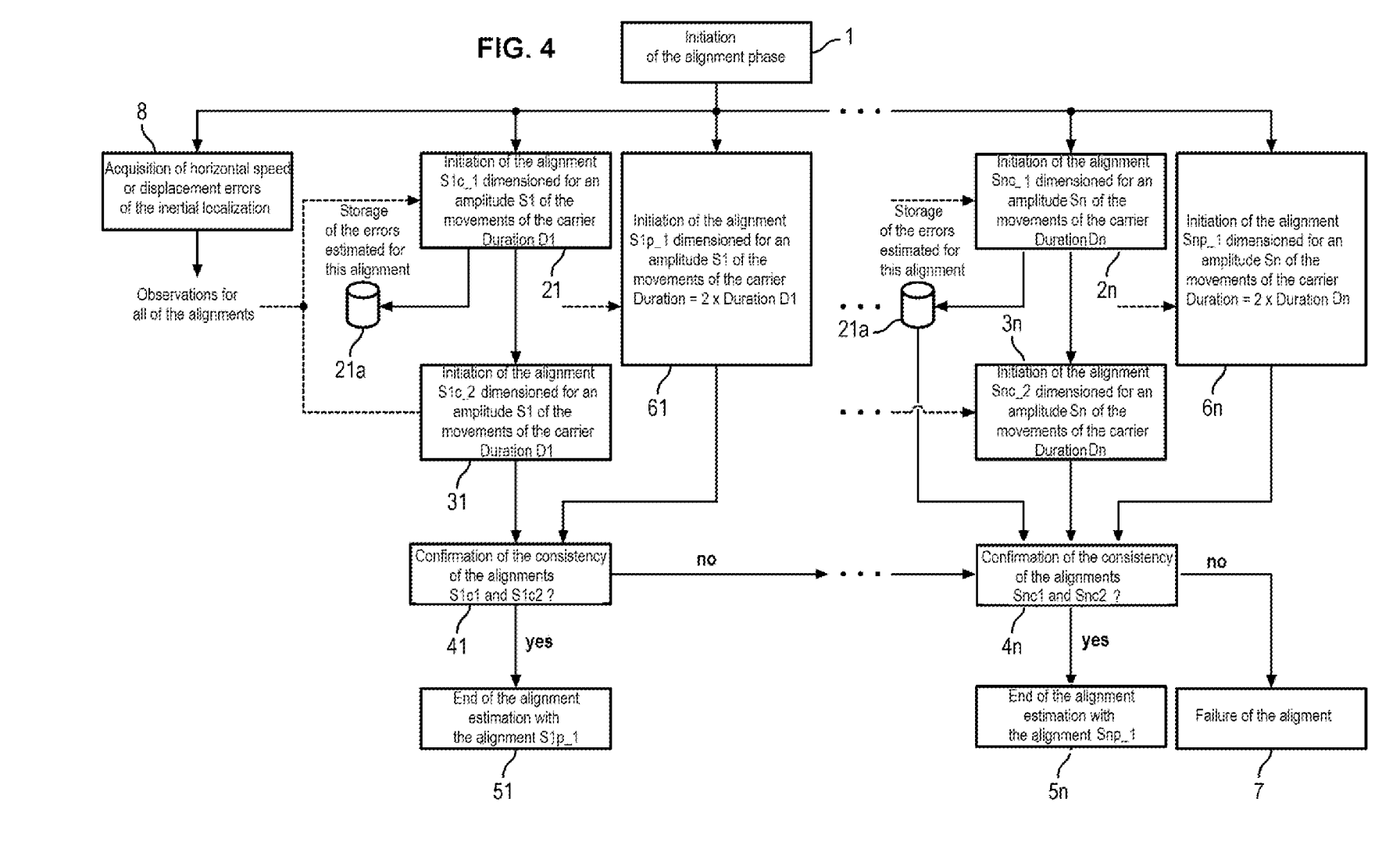
FIG. 4 is a schematic view giving the different steps of a possible process for the implementation of the invention.

The system shown in FIG. 3a or 3b implements for example the different steps shown in FIG. 4.

In a first step, the alignment phase is initiated and an initialization of the alignment information is accomplished (step 1). Initial values of attitude, and of speed and if applicable of position used are for example raw acquisition data provided by different sensors of the carrier on which the system is placed. Numerous other techniques are of course possible for this initialization.

At the conclusion of this step 1, the system launches in parallel different alignment processes (in this case labeled from 1 to n in the figure, with n a finite integer).

Each of these processes corresponds to different observation durations (D1, . . . , Dn).

They are further dimensioned with different carrier movement amplitudes.

Thus, for a first observation duration D1:

the system calculates a first set of alignment information $S1c\_1$ by implementing an alignment process (step 21) dimensioned for an amplitude S1 of the movements of the carrier; this calculation is accomplished based on initial data supplied in step 1 and speed and/or horizontal displacement errors acquired in step 8; the set of information $S1c\_1$ obtained is stored (step 21a);

the calculation of step 21 is then iterated, one or more times, using each time the set of information obtained with the previous alignment process as input data (the set of alignment information $S1c\_1$ for the calculation of the set of alignment information $S1c\_2$ in the case of step 31); each time the process is identical to that implemented in step 21 (same dimensioning S1 in amplitude and same duration D1);

at the end of the iterations, a confirmation of consistency is implemented between the alignment information obtained (step 41). For example, in the case of FIG. 4 where there is only one iteration, the consistency of the last two sets of alignment information $S1c\_1$ and $S1c\_2$ obtained is confirmed;

when the result for the confirmation step is that the information is considered consistent, the alignment is considered acceptable and concluded (step 51); a set of alignment values is then determined; this alignment set can correspond to the last set $S1c\_2$ of alignment information obtained for this process or to a recalculated set depending on this set of information $S1c\_2$ and on one or more other sets of information determined in parallel for greater observation durations (step 61) (for example an accurate alignment process $S1p\_1$ implemented with a dimensioning S1 for the carriers' movement and a longer duration than D1 (for example 2 times the duration D1)—see below).

As will have been understood, the system implements similar steps in parallel for one or more other observation durations, all distinct from one another, with different alignment processes dimensioned for different amplitudes.

In particular, for observation duration Dn and amplitude dimensioning Sn, it implements the following steps in parallel with steps 21 to 61:

steps 2n and 2na: calculation of a first set of alignment information $Snc\_1$ and storage;

step 3n: iteration and calculation, in particular of an alignment $Snc\_2$;

step 4n: confirmation of consistency;

step 5n: end of the alignment and output of a set of estimated alignment information, step 6n: alignment process implemented in parallel for a greater duration than Dn (for example 2 times Dn) and for the same amplitude dimensioning Sn.

In the example of FIG. 4, when the result of the confirmation carried out in step 41 is that the alignment information obtained are not consistent, the confirmation is triggered for the just greater observation duration and this confirmation process is iterated by successively changing the duration until an observation duration for which consistency is confirmed is found. Of course, these different confirmation processes can be carried out in parallel.

If none of the process carried out for the different durations D1, . . . , Dn allows confirming consistency, the alignment fails. A message to this effect is supplied (step 7 at the output of the consistency test Sn of the greatest duration Dn).

The different durations D1, . . . , Dn are for example selected according to a geometric series.

The number n of duration selected can typically be comprised between 3 and 5.

For example: D1=2 min 30 s, D2=5 min, D3=10 min, D4=15 min, D5=30 min.

Figure 5:
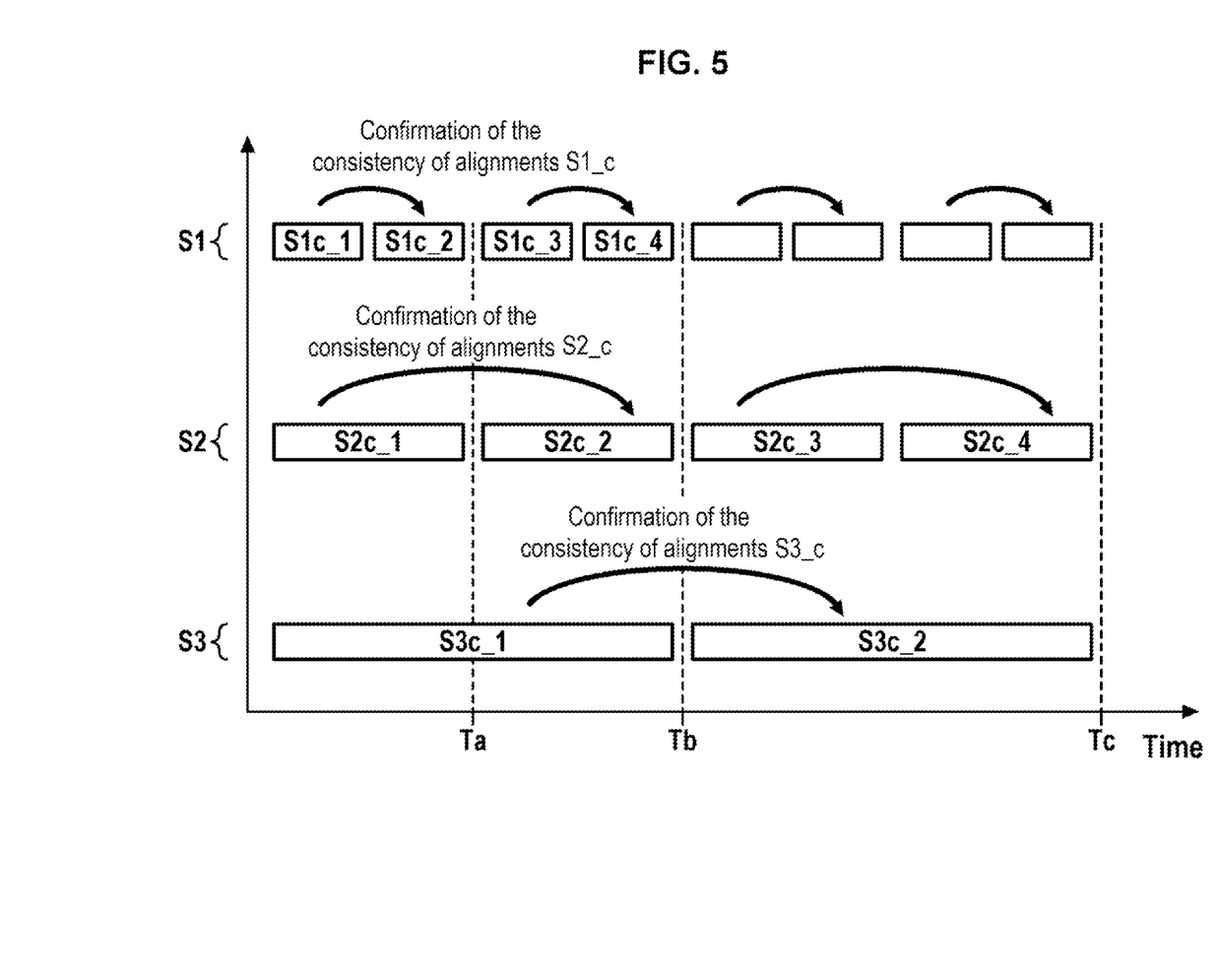
FIGS. 5 to 7 illustrate three possible embodiments of the invention.

In the case illustrated in FIG. 5, the alignment process uses three alignment durations selected according to a geometric series with ratio 2.

At the instant Ta, it is possible to confirm the consistency of the information estimated by alignments dimensioned for an amplitude S1 of the movements of the carrier no. $S1c\_1$ and $S1c\_2$.

In case of consistency the alignment is terminated and it is possible to supply the information of the last alignment $S1c\_2$ or the average of the information of the 2 alignments $S1c\_1$ and $S1c\_2$.

In case of inconsistency, 2 selections are possible:

emplacement of a ratchet effect by no longer using alignments dimensioned for an amplitude S1 of the movements of the carrier.

continuing to use alignments dimensioned for an amplitude s1 of the movements of the carrier because the movements of the carrier are not necessarily stationary. The description of this example is accomplished with this selection.

The alignment is then continued by using alignments dimensioned for an amplitude S2 of the movements of the carrier.

At the instant Tb, it is possible to confirm the consistency of information estimated by alignments $S2c\_1$ and $S2c\_2$.

In case of consistency, the alignment is terminated and the information from the last alignment $S2c\_2$ can be supplied, or the average of the information of the 2 alignments $S2c\_1$ and $S2c\_2$.

the event of inconsistency, the alignment continues by using alignments dimensioned for an amplitude S3 of the movements of the carrier.

At the instant Tc, it is possible to confirm the consistency of the information estimated by the alignments $S3c\_1$ and $S3c\_2$.

In case of consistency, the alignment is terminated and it is possible to supply the information of the last alignment $S3c\_2$ or the average of the information of the 2 alignments $S3c\_1$ and $S3c\_2$.

Figure 6:
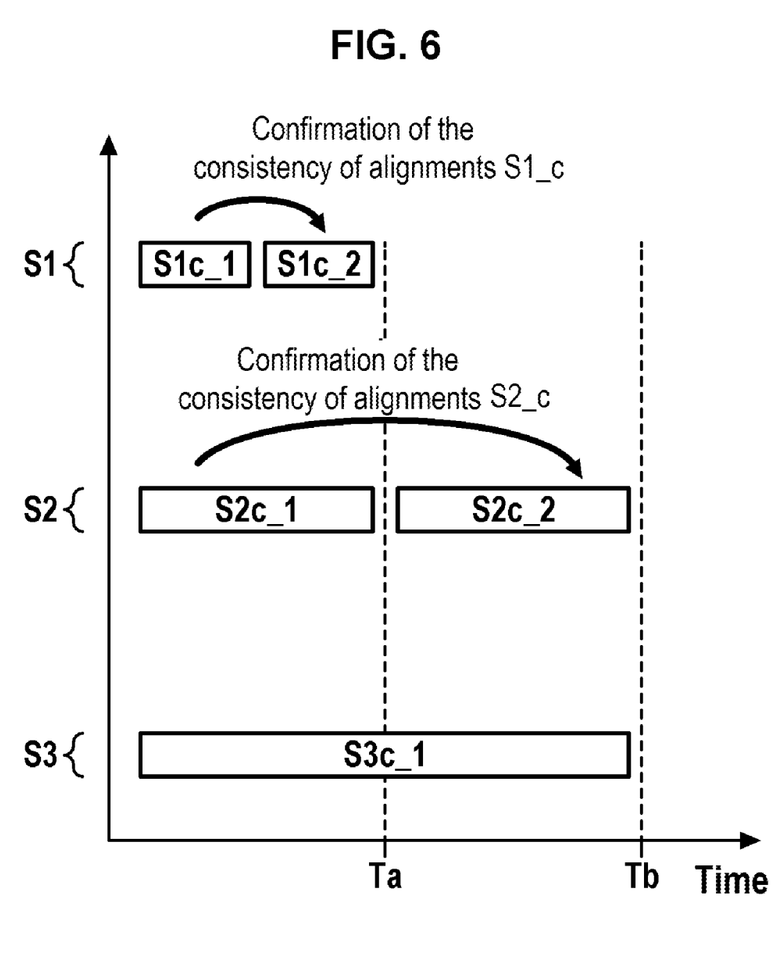

The example illustrated in FIG. 6 constitutes a variation of the first example, assuming that the amplitude S3 is always larger than the amplitude of the movements of the carrier.

In this case, it is useless to confirm the consistency of the alignment dimensioned for an amplitude S3 of the movements of the carrier. No confirmation is then implemented for this amplitude.

Also as a variant (FIG. 7), it is also possible to improve this first example by adding alignments dedicated to accuracy denoted S1$p$_* and S2$p$* (* represents the instance number of the alignment). Alignments dedicated to consistency are denoted S1$c$_* and S2$c$_*.

Figure 7:
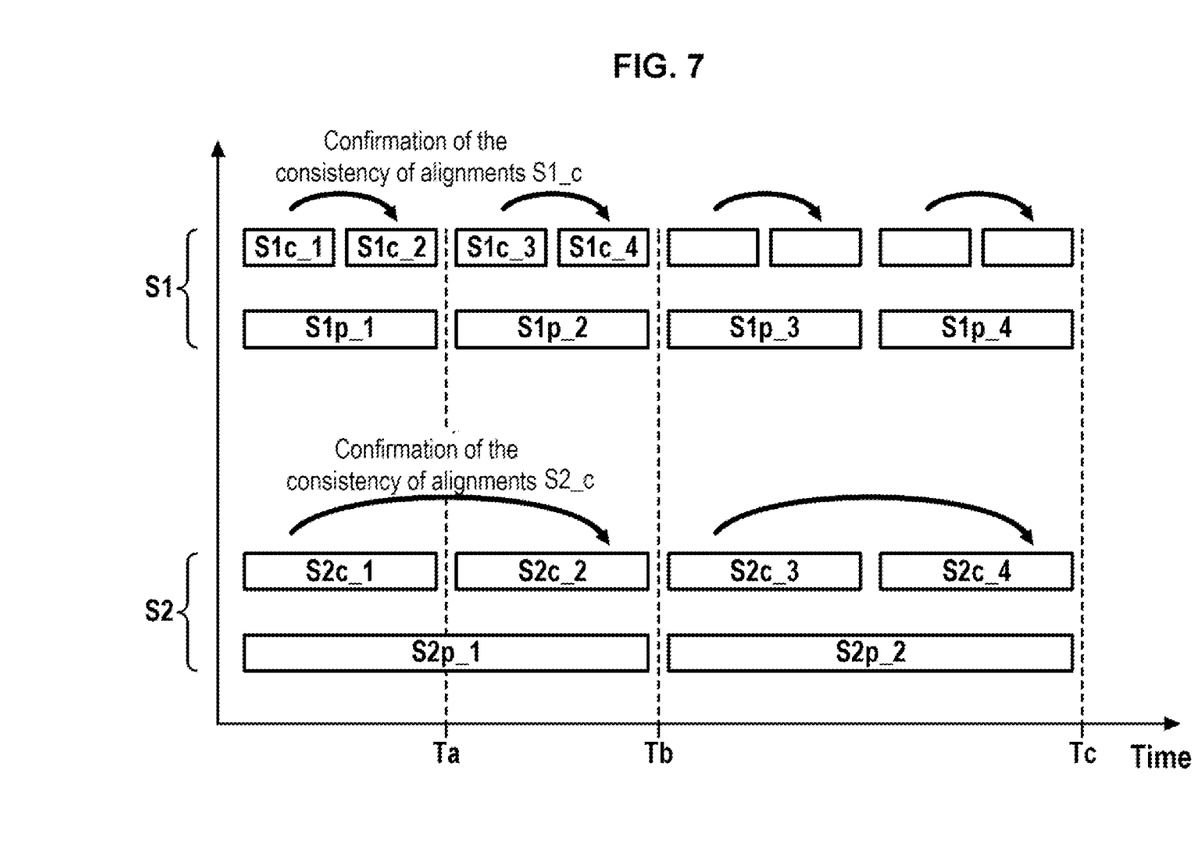

Alignments of the S1$p$_* type are organized in the same manner as alignments of the S1$c$_* type except that they continue to observe over a duration 2 times greater: in case of consistency of the 2 alignments S1$c$_1 and S1$c$_2, the alignment is terminated and corresponds to the estimate given by S1$p$_1. In case of inconsistency of these alignments, the consistency of the 2 alignments S2$c$_1 and S2$c$_2 is tested.

If these alignments are consistent, then the alignment is terminated and corresponds to the estimate given by S2$p$_1.

Confirmation of Consistency

Confirmation of consistency between 2 alignments in the different examples presented uses tests on the absolute values of the deviations of the estimates of the horizontal speed errors and on the 3 attitude errors with respect to the accuracy of the estimates of the 2 alignments. Thus it is possible to use the following processes to accomplish the confirmation of consistency.

---

IF (alignment no. 1 has failed)
OR (alignment no. 2 has failed)
OR abs(Speed error Axis X of alignment no. 1 - Speed error Axis X of alignment no. 2) > S_VX
OR abs(Speed error Axis Y of alignment no. 1 - Speed error Axis Y of alignment no. 2) > S_VY
OR abs(Attitude error Axis X of alignment no. 1 - Attitude error Axis X of alignment no. 2) > S_AX
OR abs(Attitude error Axis Y of alignment no. 1 - Attitude error Axis Y of alignment no. 2) > S_AY
OR abs(Attitude error Axis Z of alignment no. 1 - Attitude error Axis Z of alignment no. 2) > S_AZ
THEN
  Consistency = KO
OTHERWISE
  Consistency = OK
END IF

---

The thresholds S_VX, S_VY, S_AX, S_AY and S_AZ are calculated as follows:

$$S\_VX = K * \text{SquareRoot}((\text{Uncertainty about speed error Axis } X \text{ of alignment no. 1})^2 + (\text{Uncertainty about speed error Axis } X \text{ of alignment no. 2})^2)$$

$$S\_VY = K * \text{SquareRoot}((\text{Uncertainty about speed error Axis } Y \text{ of alignment no. 1})^2 + (\text{Uncertainty about speed error Axis } Y \text{ of alignment no. 2})^2)$$

$$S\_AX = K * \text{SquareRoot}((\text{Uncertainty about attitude error Axis } X \text{ of alignment no. 1})^2 + (\text{Uncertainty about attitude error Axis } X \text{ of alignment no. 2})^2)$$

$$S\_AY = K * \text{SquareRoot}((\text{Uncertainty about attitude error Axis } Y \text{ of alignment no. 1})^2 + (\text{Uncertainty about attitude error Axis } Y \text{ of alignment no. 2})^2)$$

$$S\_AZ = K * \text{SquareRoot}((\text{Uncertainty about attitude error Axis } Z \text{ of alignment no. 1})^2 + (\text{Uncertainty about attitude error Axis } Z \text{ of alignment no. 2})^2)$$

where K is a fixed constant selected depending on the desired probability of a false alarm Pfa, i.e. depending on the probability of incorrectly declaring two inconsistent alignments. Customarily, the probability of a false alarm is calculated based on the quantile of a Gaussian distribution. Likewise, the minimum bias detected with a probability of non-detection Pnd is calculated based on the statistical power of a Gaussian distribution. The following table gives a few possible values for the adjusting constant K as well as the value of the minimum detectable bias K2 for a selected Pnd equal to 0.1%.

| Pfa | K | K2 for Pnd = 0.1% |
| --- | --- | --- |
| 0.1% | 3.29 | 6.38 |
| 0.01% | 3.89 | 6.98 |
| 0.001% | 4.42 | 7.51 |

The minimum detectable values of the errors of speed and attitude of the inertial localization are calculated in the following manner:

$$VX\_detect = K2 * \text{SquareRoot}((\text{Uncertainty about speed error Axis } X \text{ of alignment no. 1})^2 + (\text{Uncertainty about speed error Axis } X \text{ of alignment no. 2})^2)$$

$$VY\_detect = K2 * \text{SquareRoot}((\text{Uncertainty about speed error Axis } Y \text{ of alignment no. 1})^2 + (\text{Uncertainty about speed error Axis } Y \text{ of alignment no. 2})^2)$$

$$AX\_detect = K2 * \text{SquareRoot}((\text{Uncertainty about attitude error Axis } X \text{ of alignment no. 1})^2 + (\text{Uncertainty about attitude error Axis } X \text{ of alignment no. 2})^2)$$

$$AY\_detect = K2 * \text{SquareRoot}((\text{Uncertainty about attitude error Axis } Y \text{ of alignment no. 1})^2 + (\text{Uncertainty about attitude error Axis } Y \text{ of alignment no. 2})^2)$$

$$AZ\_detect = K2 * \text{SquareRoot}((\text{Uncertainty about attitude error Axis } Z \text{ of alignment no. 1})^2 + (\text{Uncertainty about attitude error Axis } Z \text{ of alignment no. 2})^2)$$

The invention claimed is:

1. A method for aligning an inertial navigation system carried by a static or quasi-static carrier, the method comprising:
    implementing, simultaneously, a plurality of alignment processes, each dimensioned for a plurality amplitudes of low frequency oscillatory movements of the static or quasi-static carrier, each alignment process having a distinct observation duration and each alignment process providing an alignment information;
    determining a minimum observation duration corresponding to an alignment observation duration for which a consistency between two alignment information obtained by means of alignment processes that are dimensioned for a given amplitude of low frequency oscillatory movement of the static or quasi-static carrier is confirmed,
    determining alignment information of the inertial navigation system depending on the alignment information determined for the determined minimum observation duration.

2. The method according to claim 1, wherein the alignment information that is determined is a latest alignment information determined for the minimum observation duration.

3. The method according to claim 1, wherein the alignment information that is determined is an average of a latest alignment information determined for the minimum observation duration and alignment information determined just before for a same alignment process and the same minimum observation duration.

4. The method according to claim 1, wherein the alignment information that is determined is alignment information determined with an alignment process
   which is dimensioned for a carrier low frequency oscillatory movements amplitude of the alignment process implemented with a selected minimum observation duration, and
   which is implemented for a longer observation duration than the selected minimum observation duration.

5. The method according to claim 4, wherein the longer observation duration is equal to two times the minimum observation duration.

6. The method according to claim 1, wherein durations of observation of different alignment processes are selected according to a geometric series.

7. The method according to claim 6, wherein the geometric series is of a ratio 2.

8. The method according to claim 1, wherein the alignment information include values of attitude and/or of speed and/or of position.

9. An inertial system comprising at least one processor configured to read computer code and operate according to the computer code to:
   implement, simultaneously, a plurality of alignment processes, each dimensioned for a plurality amplitudes of low frequency oscillatory movements of a carrier, each alignment process having a distinct observation duration and each alignment process providing an alignment information;
   determine a minimum observation duration corresponding to an alignment observation duration for which a consistency between two alignment information obtained by means of alignment processes that are dimensioned for a given amplitude of low frequency oscillatory movement of the carrier is confirmed,
   determine alignment information of an inertial navigation system carried by the carrier depending on the alignment information determined for the determined minimum observation duration.

* * * * *